000000000000000

United States Patent
Burtscher

(10) Patent No.: US 8,974,156 B2
(45) Date of Patent: Mar. 10, 2015

(54) CUTTING INSERT

(75) Inventor: Peter Burtscher, Haeselgehr (AT)

(73) Assignee: Ceratizit Austria GmbH, Reutte (AT)

( * ) Notice: Subject to any disclaimer, the term of this patent is extended or adjusted under 35 U.S.C. 154(b) by 141 days.

(21) Appl. No.: 13/578,437

(22) PCT Filed: Feb. 24, 2011

(86) PCT No.: PCT/AT2011/000091
§ 371 (c)(1),
(2), (4) Date: Aug. 10, 2012

(87) PCT Pub. No.: WO2011/103609
PCT Pub. Date: Sep. 1, 2011

(65) Prior Publication Data
US 2012/0308318 A1    Dec. 6, 2012

(30) Foreign Application Priority Data

Feb. 25, 2010   (AT) .................. GM106/2010

(51) Int. Cl.
*B23C 5/20* (2006.01)
*B23B 27/16* (2006.01)
(52) U.S. Cl.
CPC ..................... *B23C 5/202* (2013.01)
USPC ............... 407/113; 407/114; 407/115
(58) Field of Classification Search
CPC ................... B23C 5/20; B23B 27/16
USPC .................................. 407/113–116
See application file for complete search history.

(56) References Cited

U.S. PATENT DOCUMENTS

| 3,942,229 | A | * | 3/1976 | Takeyama et al. | ............ 407/115 |
| 4,294,565 | A | * | 10/1981 | Erkfritz | .................. 407/113 |
| 4,681,488 | A | * | 7/1987 | Markusson | .................. 407/114 |
| 4,743,144 | A | * | 5/1988 | Shikata | .................. 407/42 |
| 4,946,318 | A | * | 8/1990 | David et al. | .................. 407/42 |
| 4,963,061 | A | * | 10/1990 | Katbi et al. | .................. 407/114 |
| 5,222,843 | A | * | 6/1993 | Katbi et al. | .................. 407/114 |
| 5,685,670 | A | * | 11/1997 | Satran | .................. 407/42 |
| 5,720,583 | A |   | 2/1998 | Bohnet et al. | |
| 6,503,028 | B1 | * | 1/2003 | Wallstrom | .................. 407/35 |

(Continued)

FOREIGN PATENT DOCUMENTS

| CN | 1154671 A | 7/1997 |
| CN | 1890044 A | 1/2007 |

(Continued)

*Primary Examiner* — Andrea Wellington
*Assistant Examiner* — Sara Addisu
(74) *Attorney, Agent, or Firm* — Laurence A. Greenberg; Werner H. Stemer; Ralph E. Locher

(57) ABSTRACT

A cutting insert with a substantially triangular or square basic form is particularly suited for face milling at high feed rates. It has convex cutting edges, which are each made up of a circular arc and at least one straight portion. Each cutting edge has, adjoining a cutting corner, a straight face cutting edge that merges with a main cutting edge, having 1 to 3 straight portions, a circular portion with a radius of at most 80% of the radius Ri of the inscribed circle. The cutting edges have an all-round cutting edge chamfer with a chamfer angle α. This chamfer angle α has along the cutting corners a value in the range from −10° to −20° and changes continuously along sub-portions of the face cutting edge and main cutting edge and along the circular portion to a constant value in the range from 0° to −10°.

17 Claims, 3 Drawing Sheets

Section R-R

(56) References Cited

U.S. PATENT DOCUMENTS

| | | | |
|---|---|---|---|
| 6,884,006 B2 * | 4/2005 | Nagashima | 407/34 |
| 7,008,148 B2 * | 3/2006 | Wiman et al. | 407/113 |
| 7,040,844 B1 * | 5/2006 | Daiguji | 407/113 |
| 7,220,083 B2 * | 5/2007 | Festeau et al. | 407/113 |
| 7,438,508 B2 * | 10/2008 | Alm et al. | 407/113 |
| 7,765,902 B2 * | 8/2010 | Kuroda et al. | 82/1.11 |
| 7,988,387 B2 * | 8/2011 | Festeau et al. | 407/113 |
| 8,057,132 B2 * | 11/2011 | Johansson et al. | 407/113 |
| 8,157,489 B2 * | 4/2012 | Wolf et al. | 408/223 |
| 8,162,572 B2 | 4/2012 | Festeau et al. | |
| 8,444,352 B2 * | 5/2013 | Festeau et al. | 407/113 |
| 8,491,234 B2 * | 7/2013 | Fang et al. | 407/113 |
| 2001/0051077 A1 | 12/2001 | Nagata et al. | |
| 2003/0002929 A1 * | 1/2003 | Nagashima | 407/40 |
| 2005/0019111 A1 * | 1/2005 | Kitagawa et al. | 407/113 |
| 2006/0210364 A1 * | 9/2006 | Bellmann et al. | 407/40 |
| 2008/0304924 A1 | 12/2008 | Engstrom et al. | |
| 2013/0028670 A1 * | 1/2013 | Luik | 407/66 |

FOREIGN PATENT DOCUMENTS

| | | |
|---|---|---|
| CN | 101318234 A | 12/2008 |
| DE | 44 11 475 A1 | 10/1995 |
| DE | 103 08 234 A1 | 9/2004 |
| EP | 392729 A * | 10/1990 |
| EP | 1 260 298 A1 | 11/2002 |
| EP | 1 689 548 B1 | 12/2007 |
| FR | 2 483 819 A1 | 12/1981 |
| JP | 54145086 A * | 11/1979 |
| JP | 2003275920 A | 9/2003 |
| TW | 200531768 A | 10/2005 |
| WO | 9630151 A | 10/1996 |

* cited by examiner

Section R-R

Section S-S

Section T-T

CUTTING INSERT

BACKGROUND OF THE INVENTION

Field of the invention

The invention relates to a cutting insert having a substantially triangular or square basic shape with a top surface and a base surface which are connected to one another by lateral flanks, wherein three or respectively four cutting edges, which are convex as seen in plan view, are formed by the intersection between top surface and the flanks and/or between base surface and the flanks, which cutting edges each consist of at least a circular arc and at least one substantially straight section and are connected to one another via cutting corners having a corner radius Re.

Such a cutting insert is described in EP 1 689 548. Cutting inserts of this type are primarily used for face milling at high feed rates in the order of magnitude of 0.5 to 3 mm/tooth with small cutting depths up to at most 2 mm in order to machine flat faces as efficiently as possible.

In a preferred configuration of a cutting insert according to this citation, the radius of the circular arc is within a range which is greater than and at least twice as large as the radius of the inscribed circle. This specification restricts the possible angular configuration between main cutting edge and wiper edge for the design of the cutting insert to a relatively small range. In addition, the cutting insert has no encircling cutting edge chamfer, and therefore the strength of the cutting edges, in particular during the milling of steps and shoulders, is often not sufficiently robust.

BRIEF SUMMARY OF THE INVENTION

The object of the invention is therefore to provide a cutting insert, in particular for milling at high feed rates, in which the range of the angular configuration between wiper edge and main cutting edge for the design of the cutting insert is as large as possible and at the same time the cutting edge strength is optimal without losing the suitability of the cutting insert for machining at high feed rates.

According to the invention, this is achieved in that each cutting edge, adjacent to a cutting corner, has a straight wiper edge which, with a circular section having a radius of at most 80% of the radius Ri of the inscribed circle, merges into a main cutting edge consisting of one to three straight sections, wherein, in the case of a plurality of straight sections of the main cutting edge, the transition regions between these sections are embodied in a circular shape having a radius within the range of 50% to 200% of the radius Ri of the inscribed circle, and in that, furthermore, the cutting insert has a cutting edge chamfer which runs all the way around and which has a chamfer angle $\alpha$ which has a substantially constant value within the range of $-10°$ to $-20°$ essentially along the cutting corners and, adjacent to the cutting corners on both sides, changes continuously along a segment of the wiper edge or of the main cutting edge, said segment being within the range of 1-1.8× the radius Re of the cutting corner, to a substantially constant value along the remaining sections of wiper edge and main cutting edge and along the circular section, said value being within the range of $0°$ to $-10°$.

Owing to the fact that the circular section has a radius of at most 80% of the radius Ri of the inscribed circle, the angle between main cutting edge and wiper edge can be configured within a very wide range in the design of the cutting insert, as a result of which the force deflection into the tool during the machining and the chip formation itself can be better optimized. Due to the special course of the cutting edge chamfer within the established regions, optimum cutting edge strength, in particular also in the region of the cutting corner, is achieved even during difficult machining operations such as the milling of shoulders and steps, without disadvantages occurring when machining at high feeds.

In a preferred configuration of the invention, the circular section has a radius of at least 50% of the radius Ri of the inscribed circle. If this lower limit for the radius of the circular section is maintained, this ensures that the circular section has sufficient strength for all the loads that normally occur during the machining.

In a further advantageous configuration, the chamfer angle $\alpha$ has a constant value of about $-15°$ essentially along the cutting corners and a value of about $0°$ within the constant range along the wiper edge, along the circular section and within the constant range along the main cutting edge. In this case, the width of the cutting edge chamfer is advantageously within a range of 0.1 to 0.4 mm. Under these conditions, the optimum strength of the cutting edges is ensured during the machining during the stresses that normally occur.

In a likewise preferred configuration of the invention, the length of the wiper edge is at least 15% of the radius Ri of the inscribed circle. In this way, a sufficiently flat surface is still achieved at the normal high feeds.

If the cutting edge is configured in such a way that the individual cutting edges are constructed symmetrically, this ensures that the cutting insert can be used both for cutting tools with right-hand rotation and for cutting tools with left-hand rotation.

In addition, if cutting edges are formed both at the intersection between the top surface and the lateral flanks and at the intersection between the base surface and the lateral flanks, the cutting insert can be used on two sides, such that, depending on the shape of the cutting insert, a total of six or eight cutting edges are available.

Furthermore, it is advantageous if the lateral flanks have plane bearing surfaces at a distance from the cutting edges. Secure positioning of the cutting insert in a correspondingly embodied insert seat in the base body of the associated cutting tool is made possible by means of these bearing surfaces.

It is also especially advantageous if the flanks are embodied as plane surfaces adjacent to the wiper edge and the straight sections of the main cutting edge and as cylindrical surfaces adjacent to the circular sections.

These further plane surfaces directly adjacent to the cutting edges create additional bearing surfaces, which, if required, make possible even better positioning and bearing of the cutting insert in the insert seat of the tool base body.

In order to achieve optimal chip formation during the machining, it is advantageous if the top surface and/or the base surface have/has a chip-breaking geometry adjacent to the cutting edge chamfer.

The invention is explained in more detail below with reference to figures.

In the drawings:

DESCRIPTION OF THE INVENTION

Figure 1:
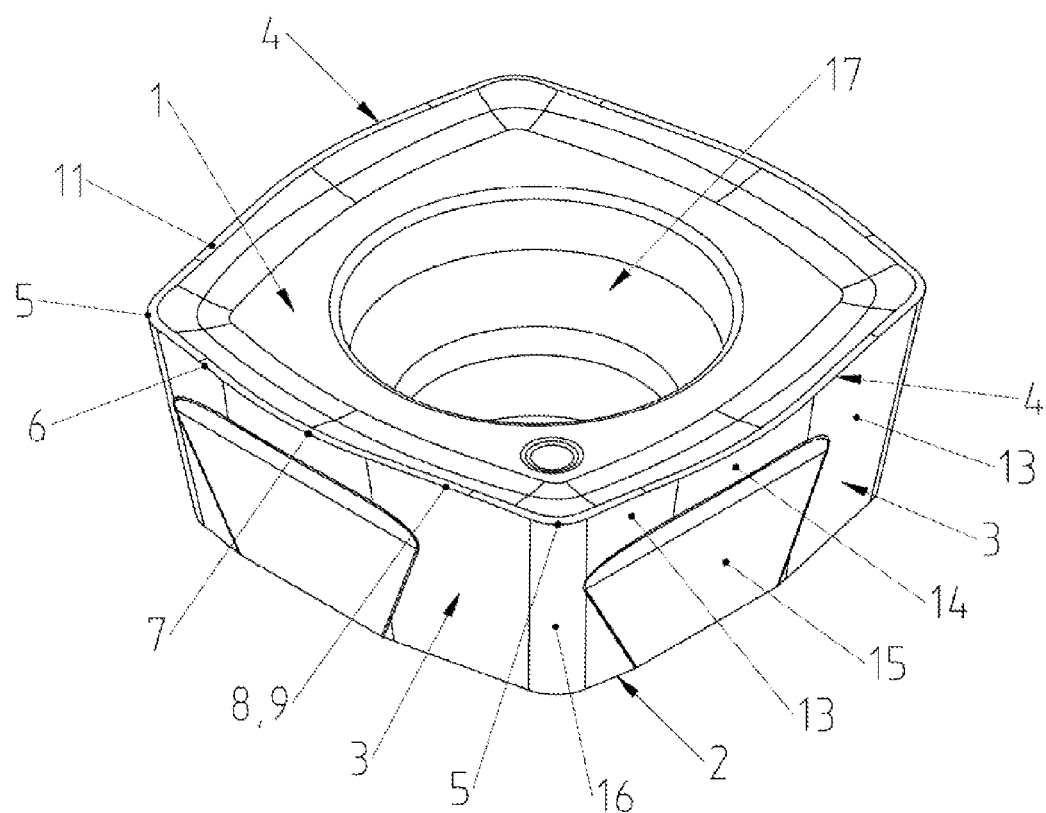
FIG. 1 shows a cutting insert according to the invention in perspective view.
Figure 2:
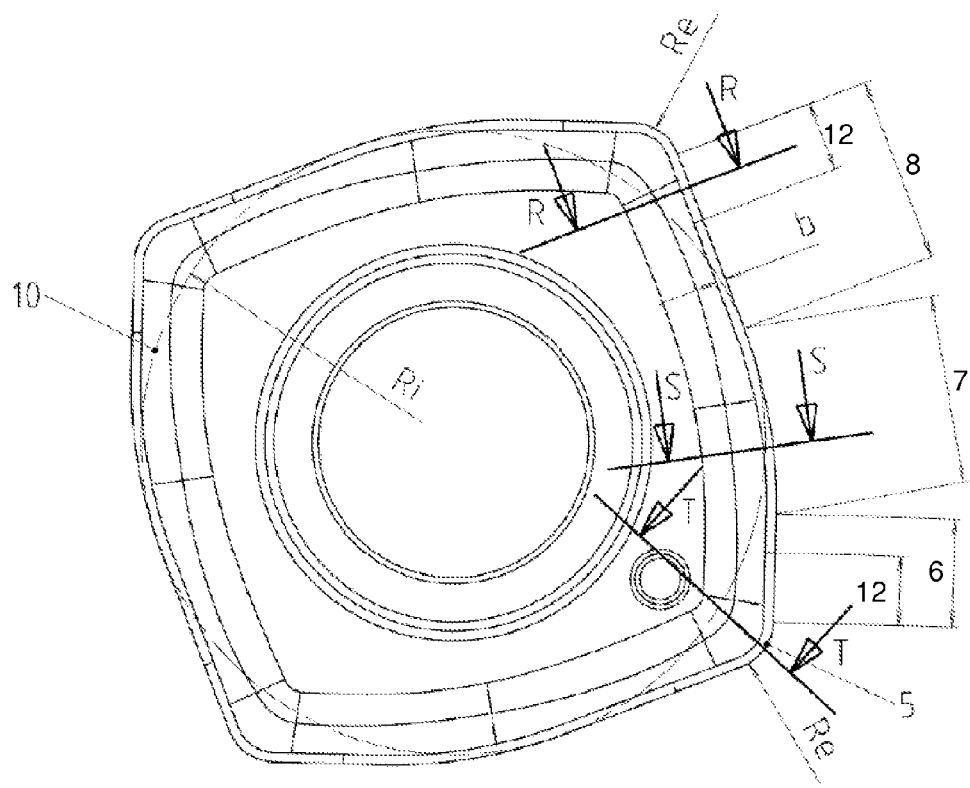
FIG. 2 shows the plan view of the cutting insert according to FIG. 1.
Figure 3:
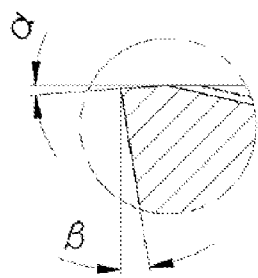
FIG. 3 shows a detail of section R-R according to FIG. 2 in an enlarged view.
Figure 4:
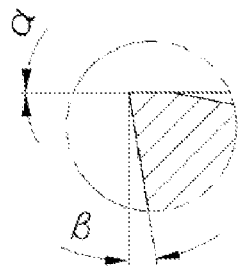
FIG. 4 shows a detail of section S-S according to FIG. 2 in an enlarged view.
Figure 5:
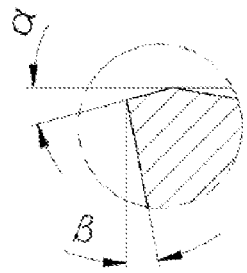
FIG. 5 shows a detail of section T-T according to FIG. 2 in an enlarged view.

FIGS. 1 and 2, in a perspective view and a plan view, respectively, show a cutting insert according to the invention having a square basic shape. The cutting insert has a top surface 1, a base surface 2 and convexly running lateral flanks 3, which run inclined relative to the top surface 1 at a clearance angle β. Convex cutting edges 4 are formed at the intersection between top surface 1 and flanks 3. Adjacent to a cutting corner 5, each cutting edge 4 has a straight wiper edge 6. The wiper edge 6 then merges with a circular section 7 into a main cutting edge 8 which consists of a straight section 9. The circular section 7 has a radius of 70% of the radius Ri of the inscribed circle 10. The theoretical circle inscribed in the top surface 1 of the cutting insert and touching all four cutting edges 4 is referred to as the inscribed circle 10. In the present case, the main cutting edge consists of a single straight section 9, but variants having up to three of these straight sections 9 which are connected by circular transition regions are equally conceivable. These circular transition regions are then embodied with a radius within the range of 50% to 200% of the radius Ri of the inscribed circle 10. Adjoining the cutting edges 4, the cutting insert has a cutting edge chamfer 11 which runs all the way around. The chamfer angle α which this cutting edge chamfer 11 encloses with the plane of the top surface 1 has a value of −15° essentially along the cutting corners 5. The chamfer angle α in this region is shown in FIG. 5 as a detail of the section T-T in FIG. 2. Adjacent to each cutting corner 5 on both sides, this chamfer angle α changes continuously along a segment of the wiper edge or of the main cutting edge to a value of 0° along the remaining sections of wiper edge 6 and main cutting edge 8 and along the circular section 7. This chamfer angle α is shown in FIG. 4 according to section S-S in FIG. 2. The length of the segments 12, along which the chamfer angle α changes continuously along the wiper edge 6 and main cutting edge 8, corresponds to approximately 1.5 times the radius Re of the cutting corner 5. A certain chamfer angle α within this region is shown in FIG. 3 according to section R-R in FIG. 2. At all the cutting edges 4, the flanks 3 adjacent to the wiper edge 6 and the main cutting edge 8 are designed as plane surfaces 13, and the flanks 3 adjacent to the circular sections 7 are designed as cylindrical surfaces 14. The flanks sections 16 adjacent to the cutting corners 5 are likewise designed as cylindrical surfaces. Cylindrical in this case refers to the fact that the radii of this surface at each level along the entire height of the flank 3 are always the same size at this location. At a slight distance from the cutting edges 4, plane bearing surfaces 15 are provided in the lateral flanks. They serve to securely position the cutting insert in the insert seat of the cutting tool in which they are used. The top surface 1 is provided with a chip-breaking geometry, to be precise in the form that flanks are provided adjacent to the cutting edge chamfer 11, said flanks falling away downwards and then merging into a flat central region which leads up to the central hole 17 in the cutting insert. In this way, excellent chip forming during the cutting process is achieved.

Figure 6:
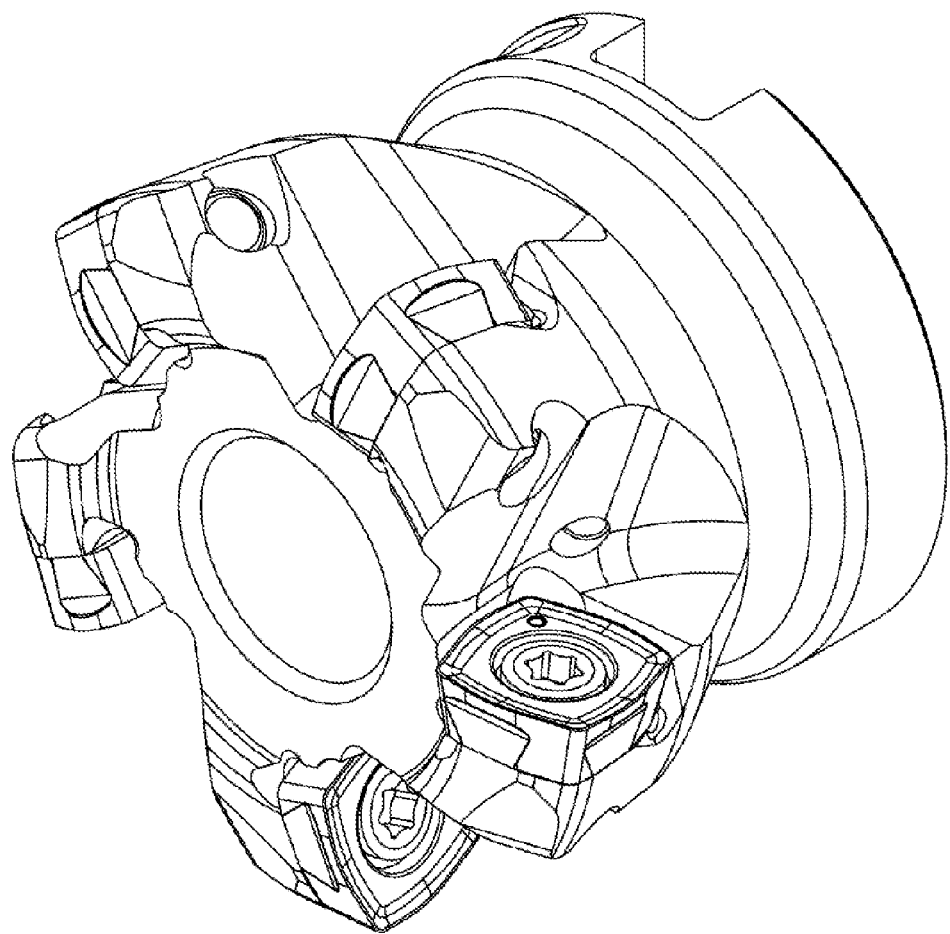
FIG. 6 shows a milling tool having a plurality of fitted cutting inserts according to FIG. 1 and FIG. 2.

The positioning of five cutting inserts embodied according to the invention in accordance with FIGS. 1 and 2 in a suitable tool base body for face milling at high feed rates is shown in FIG. 6.

The invention claimed is:

1. A cutting insert, comprising:
    a cutting insert body having a top surface, a base surface, and lateral flanks connecting said top surface and said base surface to one another;
    cutting edges, said cutting edges being convex in a plan view and being formed by an intersection between said top surface and said lateral flanks and/or by an intersection between said base surface and said lateral flanks;
    said cutting edges extending between respective cutting corners each having a corner radius Re;
    each said cutting edge, starting adjacent a cutting corner, having a straight wiper edge, followed by a circular section, and merging into a main cutting edge having at least one straight section;
    a cutting edge chamfer extending around an entire said cutting insert body and having a chamfer angle α with a substantially constant first value in a region around said cutting corners, said first value being within a range of −10° to −20°; said chamfer angle α changing continuously from said first value to a second value in regions adjacent said cutting corner on both side along a segment of said wiper edge or of said main cutting edge, respectively;
    said second value being substantially constant along the remaining sections of said wiper edge and said main cutting edge and along said circular section, said second value lying within of 0° to −10°.

2. The cutting insert according to claim 1, wherein said circular section has a radius of at least 50% of the radius Ri of the inscribed circle.

3. The cutting insert according to claim 1, wherein said first value is about −15° and said second value is about 0°.

4. The cutting insert according to claim 1, wherein said cutting edge chamfer has a width b within a range of 0.1 to 0.4 mm.

5. The cutting insert according to claim 1, wherein a length of said wiper edge is at least 15% of a radius Ri of an inscribed circle.

6. The cutting insert according to claim 1, wherein said individual cutting edges are constructed symmetrically.

7. The cutting insert according to claim 1, wherein said lateral flanks are formed with plane bearing surfaces at a distance from said cutting edges.

8. The cutting insert according to claim 1, wherein said lateral flanks are embodied as plane surfaces adjacent said wiper edge and said straight sections of said main cutting edge and said lateral flanks are embodied as cylindrical surfaces adjacent said circular sections.

9. The cutting insert according to claim 1, wherein at least one of said top surface or said base surface has a chip-breaking geometry adjacent said cutting edge chamfer.

10. The cutting insert according to claim 1, wherein said circular section following said straight wiper edge has a radius of at most 80% of a radius Ri of an inscribed circle.

11. A cutting insert, comprising
    a cutting insert body having a top surface, a base surface, and lateral flanks connecting said top surface and said base surface to one another;
    cutting edges, said cutting edges being convex in a plan view and being formed by an intersection between said top surface and said lateral flanks and/or by an intersection between said base surface and said lateral flanks;
    said cutting edges extending between respective cutting corners each having a corner radius Re;
    a cutting edge chamfer extending around an entire said cutting insert body, said cutting edge chamfer having a chamfer angle a with a substantially constant first value in a region around said cutting corners, said first value being within a range of −10° to −20°;

said cutting edge chamfer angle a changing continuously in regions adjacent both sides of each of said cutting corners along respective segments of said cutting edges from said first value to a second value;

said second value being substantially constant along remaining sections of each of said cutting edges, said second value being within a range of 0° to −10°.

12. The cutting insert according to claim 11, wherein the first value is about −15° and the second value is about 0°.

13. The cutting insert according to claim 11, wherein said cutting edge chamfer has width within a range of 0.1 to 0.4 mm.

14. The cutting insert according to claim 11, wherein said individual cutting edges are constructed symmetrically.

15. The cutting insert according to claim 11, wherein said cutting edges are formed at said intersection between said top surface and said lateral flanks and at said intersection between said base surface and said lateral flanks.

16. The cutting insert according to claim 11, wherein said lateral flanks are formed with plane bearing surfaces at a distance from said cutting edges.

17. The cutting insert according to claim 11, wherein at least one of said top surface and said base surface has a chip-breaking geometry adjacent said cutting edge chamfer.

* * * * *